United States Patent Office 3,018,477
Patented Jan. 23, 1962

3,018,477
ELECTROMAGNETIC DETECTOR DEVICES
Yves Brault and Jean Cauchois, Paris, France, assignors to Compagnie Generale de Telegraphie Sans Fil, a corporation of France
Filed May 22, 1957, Ser. No. 660,784
Claims priority, application France May 29, 1956
5 Claims. (Cl. 343—7.7)

The present invention relates to electromagnetic pulse-modulated target detector devices of the radar type.

It is well known that, in so far as the elimination of fixed echoes of all kinds is concerned, radar systems operating on comparatively long waves, such as, for instance, metric waves, present substantial advantages over those operating on ultra-short waves, such as centimetric waves. More particularly, they make it possible to avoid the appearance on the display screen of any clutter hash due to echoes from quasi stationary objects, i.e. from objects which, although stationary by their nature, may undergo some occasional fluctuations such as clouds, wind-stirred woods, sea surface, etc. which as a rule do not interest the user.

However, practical considerations, such as the need for highly directive aerials of reduced size, capable of undergoing a rapid rotary motion, make it necessary to use ultra high frequency waves.

It is an object of the invention to provide a radar detector operating on ultra high frequency waves and yet having the advantages of radars operating on longer waves in so far as the elimination of echoes from stationary and, more particularly, from quasi stationary objects is concerned. In addition, a radar system provided by the invention offers the advantage of avoiding the use of certain apparatus of complex construction, such as the highly stabilized local oscillators and coherent oscillators which are essential in conventional radars. Moreover, a radar system according to the invention can be operated as a diversity radar system, thus presenting all the advantages inherent to this technique.

In this case, it is possible to use simultaneously two indicators at the radar output, for instance of the P.P.I. type, one recording all the echoes and the other only the echoes from the mobile targets.

According to a feature of the invention, radar signals are transmitted on two frequencies close to each other, while maintaining stable the difference $f$ between these two frequencies. It will be appreciated that a perfect stability of the radiated frequencies is not essential: it suffices that their difference be constant.

At the receiving end, both echoes are received through separate channels and are made to supply intermediate frequency signals which differ from one another only on account of the Doppler effect. The respective phases of the output signals are then compared in a phase detector of a conventional type.

It may thus be appreciated that in so far as echo fluctuations from quasi stationary objects are concerned, everything happens as though the radar system were operated not on an ultra high frequency, but on the frequency $f$ which may be given any suitable value, for example a value corresponding to a metric wave.

The invention will be better understood from the following description taken in connection with the appended drawings wherein.

Figure 1:
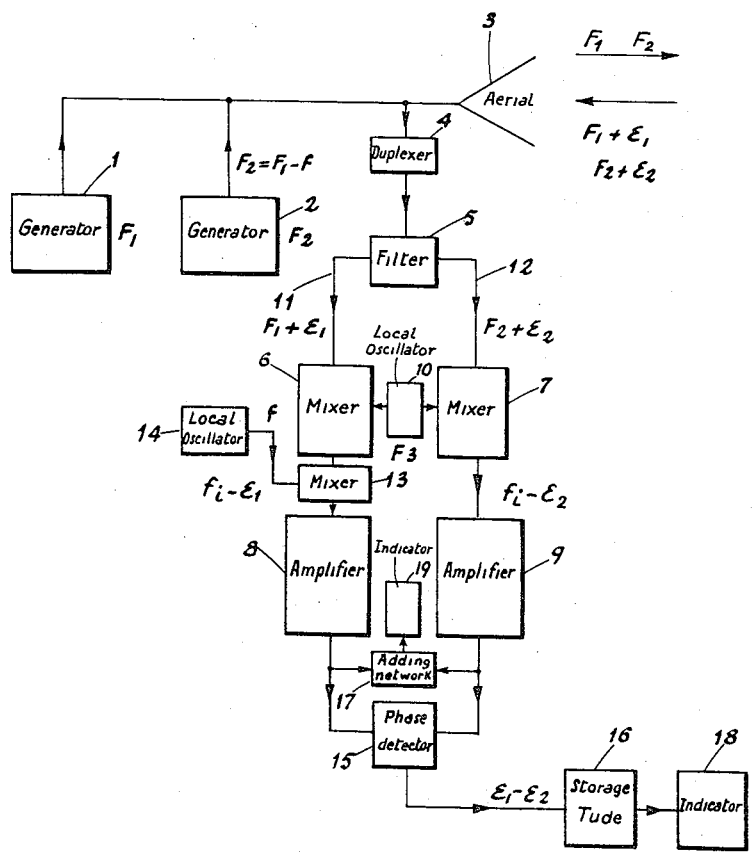
FIG. 1 is a simplified block diagram of a radar device according to the invention.

Referring now to FIG. 1, two generators 1 and 2 simultaneously transmit identical ultra high frequency pulses, the respective carrier frequencies of which $F_1$ and $F_2$ show a perfectly stable difference $F_1-F_2=f$, which can be readily obtained by any known means. These pulses are radiated by a common aerial 3.

At the receiver, the echo signals corresponding to these pulses are affected by the Doppler effect if the objects from which they are reflected are mobile, their frequencies becoming respectively $F_1+\epsilon_1$ and $F_2+\epsilon_2$. These signals are directed, through a duplexer 4 and filters 5, along two distinct channels 11 and 12 comprising respective mixers 6 and 7.

These mixers are fed by a local oscillator 10, whose frequency $F_3$ lies outside the intervals defined by frequencies $F_1$ and $F_2$, exclusive of these frequencies.

Mixer 6 feeds a mixer 13, which is also fed by a local oscillator 14 whose frequency $f$ is equal to the difference between frequencies $F_1$ and $F_2$, so that, for the fixed echoes, intermediate frequency signals of the same frequency $f_1$ are obtained at the output of mixers 13 and 7, while for mobile echoes frequency values $f_1-\epsilon_1$ and $f_1-\epsilon_2$ are obtained.

The output signals of mixers 7 and 13 are applied, respectively, to amplifiers 8 and 9 which are tuned to the intermediate frequency $f_1$, and their respective phases are then compared in a conventional phase detector 15. This latter supplies constant amplitude pulses for the fixed echoes and pulses having a fluctuating amplitude for the mobile echoes. Phase detector 15 is followed by a conventional memory or delay device 16, wherein the voltage amplitude of each signal supplied by detector 15 is compared to the voltage amplitude of the signal which follows. A memory tube of a known type may for instance be used which supplies at every instant at its collector a voltage equal to the difference between the voltages of the two last signals. Since fixed echoes provide equal amplitudes, they are eliminated, whereas mobile echoes are preserved. The corresponding voltages are applied to a conventional display device 18.

It will be noted that residual frequency fluctuations $\epsilon_1-\epsilon_2$ result from the difference between the Doppler effects on frequencies $F_1$ and $F_2$, i.e. substantially from the Doppler effect on frequency $f$, and from any possible lack of stability of the difference between frequencies $F_1$ and $F_2$, i.e. of frequency $f$. Since this latter frequency is comparatively low, its variation can be readily made negligible. As to any frequency fluctuations of the local oscillator 10, they are immaterial since they simultaneously affect both channels 11 and 12.

To avoid jamming on one of frequencies $F_1$ and $F_2$, or on both, transmission frequencies can be simultaneously shifted, provided they remain within the limits of the passing band of filter 5 and provided their difference remains constant.

It is to be understood that various modifications within reach of those skilled in the art may be made on the basis of the structure just described; for instance, the filtering may be effected either in the ultra high frequency range, as shown, or at a lower frequency, after having effected a first frequency change.

Also, frequency $f$ may be mixed either by addition in channel 11, as shown in FIG. 1, or by subtraction in channel 12, provided that a same intermediate frequency $f_1$ is obtained in both channels.

It will also be appreciated that, without departing from the scope of the invention, signals of the same intermediate frequency can be obtained in both channels 11 and 12 by means of said frequency $f$ by other known conventional methods.

Figure 2:
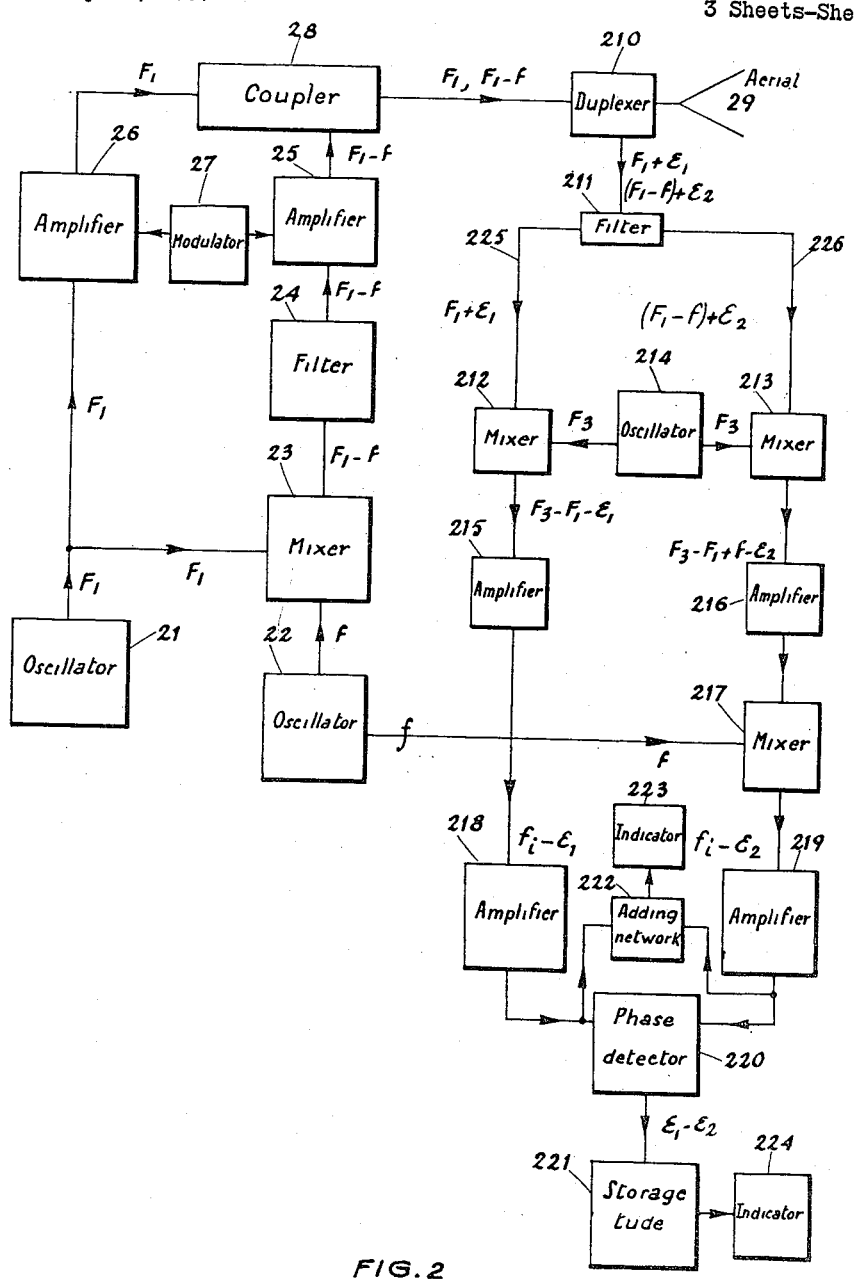
FIGS. 2 and 3 are block diagrams of two embodiments of the radar device according to the invention.
Figure 3:
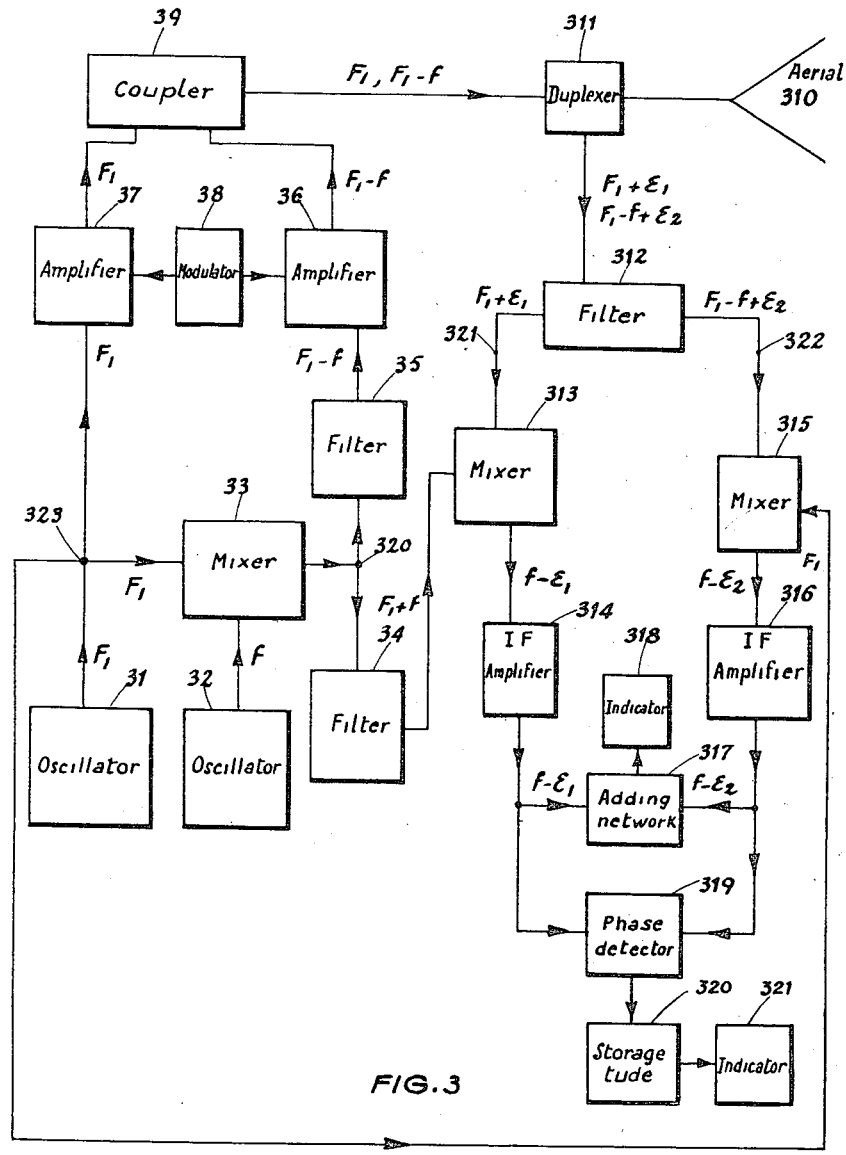

Of course oscillator 14 having frequency $f$, may be used, for maintaining the difference between transmitting frequencies $F_1$ and $F_2$ equal to $f$, as will be shown in connection with FIGURES 2 and 3.

Finally, the device according to the invention, while assuring the elimination of fixed echoes, may be simultaneously used as a conventional radar system of the diversity type since the transmission is effected on two different closely spaced frequencies. It will suffice to combine in a known manner the respective outputs of channels 11 and 12 in a conventional integrating device 17 which will supply low frequency signals corresponding to all the received echoes, fixed or mobile; these signals feed an indicator 19.

According to a particular embodiment of the device according to the invention, shown in FIG. 2, a conventional ultra high frequency oscillator 21 having a frequency $F_1$, equal for instance to 3,000 mc./s., feeds a power amplifier 26 and a mixer 23, which also receives an oscillation supplied by a local oscillator 22 having a very stable frequency $f$ of, for instance, 100 mc./s. This signal may be, for instance, obtained, as well known in the art, from a crystal oscillator by frequency multiplication. A beat signal having the frequency $F_1-f$ is filtered at 24 and applied to the input of an ultra high frequency power amplifier 25. A pulse modulator 27, of conventional type, drives simultaneously both amplifiers 25 and 26, so that at their respective outputs simultaneous pulses are obtained on two close frequencies $F_1$ and $F_1-f$. These two pulses are fed through conventional coupler 28 and duplexer 210 to a transmission and reception aerial 29.

Upon their reception, echo signals are directed through duplexer 210 to a plurality of filters 211, adapted to separate into two channels 225 and 226, frequencies $F_1+\epsilon_1$ and $F_1-f+\epsilon_2$, the values $\epsilon_1$ and $\epsilon_2$ being small as compared to $F_1$ and $f$ and corresponding to the Doppler effect.

Channels 225 and 226 comprise respective mixers 212 and 213 which are fed by an oscillator 214 of frequency $F_3$ equal, for instance, to 3,030 mc./s., i.e. lying outside the frequency band limited by the frequencies $F_1$ and $F_1-f$. The frequencies obtained at the respective outputs of mixers 212 and 213 are $$F_3-F_1-\epsilon_1=30 \text{ mc./s.}-\epsilon_1$$

and $$F_3-F_1+f_1-\epsilon_2=130 \text{ mc./s.}-\epsilon_2$$

The corresponding signals are amplified in two amplifiers 215 and 216, respectively.

The output from amplifier 216 is applied to a mixer 217 which also receives the output signal from local oscillator 22. The output signal of mixer 217, having a frequency $F_3-F_1-\epsilon_2=f_1-\epsilon_2$, is fed to an amplifier 219 and the output signal from amplifier 215, having a frequency $F_3-F_1-\epsilon_2=f_1-\epsilon_1$, is applied to an amplifier 218. Both amplifiers 218 and 219 are tuned to the frequency $F_3-F_1=f_1$, i.e. 30 mc./s. which is the intermediate frequency of the receiver. They amplify, respectively, signals whose frequency is $f_1-\epsilon_1$ and $f_1-\epsilon_2$.

These signals may be used for two purposes. First, the radar shown can be caused to operate as a diversity radar system, in accordance with a familiar technique the advantages of which are well known, namely by feeding through a conventional integrator 222, an indicating device 223 which records all the echoes, both fixed and mobile. On the other hand and as described above, these signals may be used for eliminating the fixed echoes by means of a phase detector 220 which feeds a memory tube 221, which in turn, feeds another indicator 229 to supply images of mobile echoes only.

Besides, when the radar is jammed, normal operation can frequently be assured by using one only of the two reception channels, since the jamming is generally predominant on one of the two channel frequencies.

Another embodiment of the invention is shown in FIG. 3. The device comprises in this case, as in the embodiment of FIG. 2, an oscillator 31 of an ultra high frequency $F_1$, which feeds a mixer 33. This mixer also receives a signal having a frequency $f$ from a metric wave oscillator 32. However, in this embodiment, two beat signals of respective frequencies $F_1+f$ and $F_1-f$ are collected at the output 320 of mixer 33. They are then separated in filters 34 and 35, tuned respectively to these frequencies. The signal from filter 35 is applied to an amplifier 36. A modulator 38 simultaneously modulates the output signals of amplifiers 36 and 37 and the pulses obtained therefrom, whose respective frequencies are $F_1$ and $F_1-f$, are radiated by an aerial 310 through a coupler 39 and a duplexer 311. The transmitting chain is thus identical to the embodiment illustrated in FIG. 2.

At the receiver the echo signals collected by an aerial 310 are fed through duplexer 311 to a filtering arrangement 312 where they are separated into two channels 321 and 322, corresponding respectively to the frequencies $F_1+\epsilon_1$ and $F_1-f+\epsilon_2$. These channels feed respectively mixers 313 and 315. Mixer 313 also receives the signal of frequency $F_1+f$, derived from filter 34, and mixer 315 a signal of frequency $F_1$ collected at the output 323 of oscillator 31. At the output of mixers 313 and 315 signals of respective frequencies $f-\epsilon_1$, and $f-\epsilon_2$ are collected and applied, respectively, to intermediate frequency amplifiers 314 and 316 which provide signals identical to those obtained at the output of amplifiers 218 and 219 in FIG. 2.

The essential difference from the embodiment illustrated in FIG. 2 is the omission of oscillator 214 and of the corresponding amplifiers 215 and 216, since in this case the intermediate frequency is the same as the frequency of oscillator 32.

As explained in the case of FIG. 2, the radar of FIG. 3 can be operated as a diversity radar system through integrator 317 and indicator 318; the elimination of the fixed echoes is assured through phase detector 319, memory device 320 and indicator 321, all as explained above.

It is obvious for those skilled in the art, that filtering problems which might arise, especially in relation with elements 34 and 35, may be simplified by known methods, for instance by using auxiliary frequency changes which are well known and need not be described in this specification.

The essential advantages of the radar system according to the invention may be summed up as follows: images of a better quality, comparable to those supplied by radars operating on metric waves, are obtained; certain components, essential in conventional radar systems, such as the ultra high frequency local oscillator of high stability and coherent oscillators of complex design, are eliminated; the transmission frequency can be varied within certain limits, thus avoiding jamming interference; the radar may be operated as a diversity radar system.

It is to be understood that the invention is in no way limited to the embodiments illustrated and described which have been given only by way of examples.

What we claim is:

1. A pulse modulated radar system for radiating two signals of respective first and second frequencies having a fixed difference and comprising: two narrow band reception channels for separating the echo signals respectively corresponding to said signals; respective means in said channels for changing said echo signals to respective intermediate frequency signals which have a common frequency for fixed echoes and frequencies which, for mobile echoes, differ from said common frequency by amounts corresponding to the Doppler effect on said first and second frequencies; a phase detector coupled to both said channels; means for comparing any two consecutive output signals of said detector; and indicator means coupled to said comparing means.

2. A pulse modulated radar system for radiating two signals of respective first and second frequencies close to each other and having a fixed difference and comprising: a first and a second narrow band channel for echo signals respectively corresponding to said signals; said first channel comprising a first mixer; said second channel comprising second and third mixers in series; an oscillator, having a frequency outside the frequency band limited by said first and second frequencies exclusive of said frequencies, coupled to said first and second mixers; a further oscillator coupled to said third mixer and having a frequency equal to said fixed frequency difference; a phase detector coupled to both said channels; means for comparing any two consecutive output signals of said detector; and indicator means coupled to said means.

3. A pulse modulated radar system comprising: a first and a second oscillator for providing a first and a second signal; mixing means for mixing said first and second signals to provide a third signal; means for pulse modulating and radiating said first and third signals; two separate narrow band channels for receiving echo signals corresponding to said first and third signals respectively; a third oscillator having a frequency outside the frequency band limited by said first and third signal frequencies; respective mixers in said two channels for mixing their respective echo signals with said third oscillator output; a third mixer in one of said channels for receiving said mixer output and mixing it with said second signal; a phase detector coupled to both said channels; means for comparing any two consecutive output signals of said detector; and indicator means coupled to said means.

4. A pulse modulated radar system comprising: a first and a second oscillator for providing a first and a second signal; a mixing means for mixing said first and second signals to provide a third and a fourth signal; means for pulse modulating and radiating said first and third signals; two separate narrow band channels for receiving echo signals corresponding to said first and third signals respectively; respective mixers in said channels for mixing the corresponding echo signals with said fourth and third signal respectively; a phase detector coupled to both said channels; means for comparing any two consecutive output signals of said detector; and indicator means coupled to said means.

5. A pulse modulated radar system for radiating two signals of respective first and second frequencies having a fixed difference and comprising; two narrow pass-band reception channels for separating the echo signals respectively corresponding to said signals; respective means in said channels for changing said echo signals to respective intermediate frequency signals which have a common frequency for fixed echoes and frequencies which, for mobile echoes, differ from said common frequency by amounts corresponding to the Doppler effect on said first and second frequencies; a phase detector coupled to both said channels; means for comparing any two consecutive output signals of said detector; first indicator means coupled to said comparing means; integrating means coupled to both said channels; and second indicator means coupled to said integrator means for displaying all the echo signals collected by said channels.

References Cited in the file of this patent
UNITED STATES PATENTS
2,658,195 McConnell _____ Nov. 3, 1953